(12) United States Patent
Okumura

(10) Patent No.: US 9,437,007 B2
(45) Date of Patent: Sep. 6, 2016

(54) IMAGE PROCESSING DEVICE

(71) Applicant: KYOCERA Document Solutions Inc., Osaka-shi (JP)

(72) Inventor: Ryuichi Okumura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/747,881

(22) Filed: Jun. 23, 2015

(65) Prior Publication Data

US 2015/0379340 A1    Dec. 31, 2015

(30) Foreign Application Priority Data

Jun. 27, 2014    (JP) ................. 2014-132380

(51) Int. Cl.
*G06K 9/32* (2006.01)
*G06T 7/00* (2006.01)
*G06K 9/00* (2006.01)
*G06K 9/38* (2006.01)
*G06K 9/46* (2006.01)

(52) U.S. Cl.
CPC ......... *G06T 7/0079* (2013.01); *G06K 9/00456* (2013.01); *G06K 9/38* (2013.01); *G06K 9/00463* (2013.01); *G06K 9/4652* (2013.01); *G06K 2209/01* (2013.01); *G06T 2207/10008* (2013.01); *G06T 2207/30176* (2013.01)

(58) Field of Classification Search
CPC ..................... G06K 9/00456; G06K 9/00463; G06K 9/52; G06T 7/0079; G06T 2207/20092; G06T 7/60

USPC .................................................. 382/176–177
See application file for complete search history.

(56) References Cited

U.S. PATENT DOCUMENTS

| | | | | |
|---|---|---|---|---|
| 6,356,657 | B1 * | 3/2002 | Takaoka ............ | G06K 9/00463 382/173 |
| 6,625,312 | B1 * | 9/2003 | Nagarajan ........... | G06K 9/00456 358/2.1 |
| 7,013,309 | B2 * | 3/2006 | Chakraborty ....... | G06F 17/2241 |
| 7,657,104 | B2 * | 2/2010 | Deninger ................ | G06F 21/55 382/224 |
| 2007/0071320 | A1 * | 3/2007 | Yada .................... | G06K 7/1456 382/181 |

FOREIGN PATENT DOCUMENTS

JP    2002-016798 A    1/2002

* cited by examiner

*Primary Examiner* — Kanjibhai Patel
(74) *Attorney, Agent, or Firm* — Studebaker & Brackett PC

(57) ABSTRACT

A binarizing section generates binary image data representing a binary image from raster image data representing a raster image. A white-pixel ratio determining section determines, based on the binary image data, a white pixel ratio for each line of the binary image and a position of each of lines having a white pixel ratio equal to or greater than a predetermined first threshold among the lines of the binary image, and also determines a white pixel ratio for an entirety of the binary image. An image-type determining section determines that the raster image is a photographic image when the white pixel ratio of the entirety of the binary image is equal to or less than a predetermined second threshold, and that the raster image includes a text image when the lines having a white pixel ratio equal to or greater than the first threshold appear cyclically in the binary image.

7 Claims, 4 Drawing Sheets

IMAGE PROCESSING DEVICE

INCORPORATION BY REFERENCE

The present application claims priority under 35 U.S.C. §119 to Japanese Patent Application No. 2014-132380, filed Jun. 27, 2014. The contents of this application are incorporated herein by reference in their entirety.

BACKGROUND

The present disclosure relates to image processing devices.

Images captured by digital cameras or document scanners are represented by raster image data that is a matrix of pixel values. Therefore, determination of the type of an image represented by raster image data typically requires a user to make a visual inspection and settings.

Some image processing devices perform region separation. Region separation refers to a process of classifying an image into different regions, including photographic, pictorial, line drawing, text, and background regions. Some other image processing devices determine whether an image contains photographic, pictorial, text, and line drawing image regions.

SUMMARY

An image processing device according to the present disclosure includes: a binarizing section that generates binary image data representing a binary image from raster image data representing a raster image; a white-pixel ratio determining section that, based on the binary image data, determines a white pixel ratio for each of a plurality of lines of the binary image and a position of each of lines having a white pixel ratio equal to or greater than a predetermined first threshold among the plurality of lines of the binary image, and determines a white pixel ratio for an entirety of the binary image; and an image-type determining section that determines an image type of the raster image based on the position of each of the lines having a white pixel ratio equal to or greater than the first threshold and the white pixel ratio of the entirety of the binary image. The image-type determining section determines that the raster image is a photographic image when the white pixel ratio of the entirety of the binary image is equal to or less than a predetermined second threshold, and that the raster image includes a text image when the lines having a white pixel ratio equal to or greater than the first threshold appear cyclically in the binary image.

DETAILED DESCRIPTION

The following describes an embodiment of the present disclosure with reference to the accompanying drawings.

Figure 1:
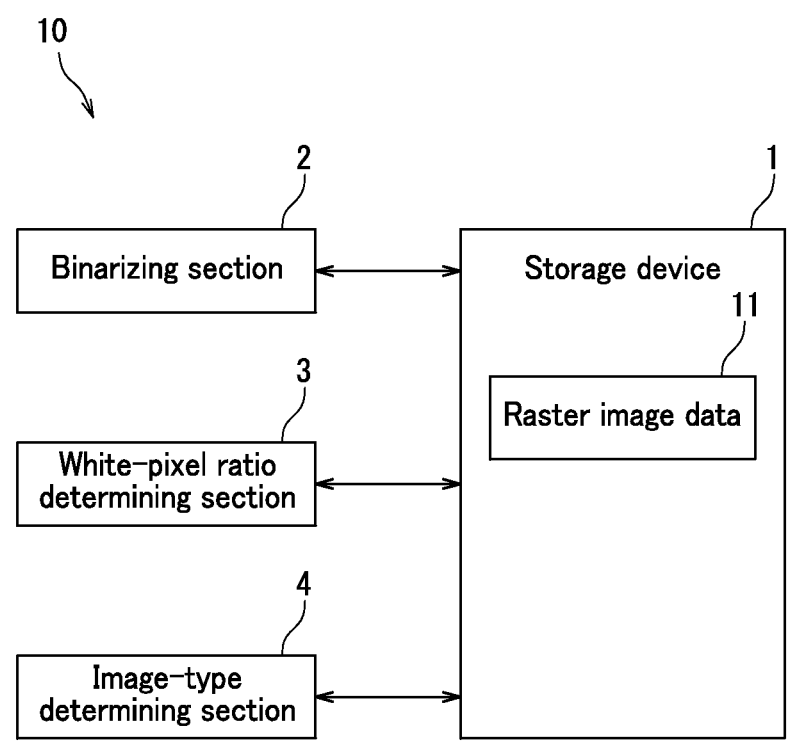
FIG. 1 is a block diagram showing the structure of an image processing device according to an embodiment of the present disclosure.

FIG. 1 is a block diagram showing the structure of an image processing device 10 according to the embodiment of the present disclosure. The image processing device 10 shown in FIG. 1 includes a storage device 1, a binarizing section 2, a white-pixel ratio determining section 3, and an image-type determining section 4.

As shown in FIG. 1, the storage device 1 stores raster image data 11 acquired for example by an image reading device. The storage device 1 may for example be a random access memory (RAM). The raster image data 11 is image data in for example a bitmap format or a joint photographic experts group (JPEG) format.

The image processing device 10 shown in FIG. 1 may be implemented by hardware such as application specific integrated circuits (ASICs) or by software through execution of a program by a computer. The storage device 1 is used as a work area by the binarizing section 2, the white-pixel ratio determining section 3, and the image-type determining section 4.

The binarizing section 2 generates binary image data representing a binary image from the raster image data 11 representing a raster image.

When the raster image data 11 is monochrome image data, the binarizing section 2 binarizes the raster image data 11 into binary image data using a predetermined threshold.

In one example in which the raster image data 11 is color image data, the binarizing section 2 removes color-difference components, converts the resulting color image data into grayscale data, and binarizes the resulting grayscale data into binary image data. In another example in which the raster image data 11 is color image data, the binarizing section 2 converts the raster image data 11 into CMY image data. The binarizing section 2 then computes the sum total of CMY values per pixel of the CMY image data and binarizes the resulting CMY image data by applying a threshold to each sum total.

Based on the resulting binary image data, the white-pixel ratio determining section 3: (a) determines the white-pixel ratio for each line of the binary image represented by the binary image data and the position of each of lines having a white-pixel ratio equal to or greater than a predetermined first threshold among the lines of the binary image; and (b) determines the white-pixel ratio of the entirety of the binary image represented by the binary image data.

In the description, a pixel having zero density is referred to as a "white pixel", whereas a pixel having non-zero density is referred to as a "black pixel".

The image-type determining section 4 determines the type of the image represented by the raster image data 11 based on the white-pixel ratio of the entirety of the binary image and the position of each of the lines having a white-pixel ratio equal to or greater than the first threshold among the lines of the binary image.

More specifically, the image-type determining section 4 (c) determines that the image represented by the raster image data 11 is a photographic image when the white-pixel ratio of the entirety of the binary image is equal to or less than a predetermined second threshold. The image-type determining section 4 (d) determines that the image represented by the raster image data 11 includes a text image when the lines having a white-pixel ratio equal to or greater than the first threshold appear cyclically in the binary image.

In the case of a text image, spaces between text strings—lines having a white-pixel ratio equal to or greater than the first threshold—are detected as appearing cyclically. Consequently, when lines having a white-pixel ratio equal to or greater than the first threshold appear cyclically, the image represented by the raster image data 11 is determined to include a text image.

For example, when an image includes a region in which a set of n lines having white-pixel ratios equal to or greater than the first threshold and that are similar values within a predetermined error range and a set of m lines that are less than the first threshold and that are similar values within a predetermined error range are alternately detected, the region is determined to be a text image region.

Therefore, the image-type determining section 4 determines that the image represented by the raster image data 11 is a text image when lines having a white-pixel ratio equal to or greater than the first threshold cyclically appear in the entirety of the binary image. On the other hand, the image-type determining section 4 determines that the image represented by the raster image data 11 is a mixture image containing both a photographic image region and a text image region when lines having a white-pixel ratio equal to or less than the first threshold cyclically appear in a partial region of the binary image.

The white-pixel ratio determining section 3 further determines the number of white lines in the binary image data. When the number of white lines is equal to or greater than a predetermined third threshold, the image-type determining section 4 determines that the image represented by the raster image data 11 is a text image.

Figure 2:
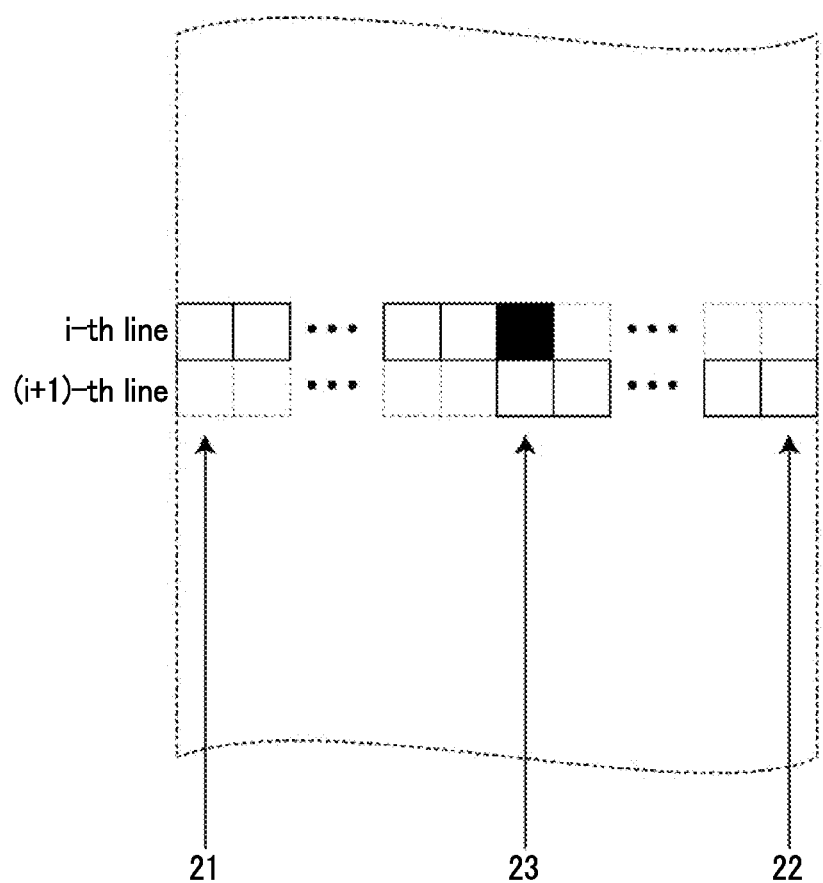
FIG. 2 illustrates determination of a white line performed by the image processing device shown in FIG. 1.

FIG. 2 illustrates the determination of a white line performed by the image processing device 10 shown in FIG. 1. In the present embodiment, the white-pixel ratio determining section 3 detects, as a white line from all the lines of the binary image, a line in which all pixels from a start pixel position 21 to an end pixel position 22 are white pixels. The white-pixel ratio determining section 3 also detects an i-th line as a white line on condition, as shown in FIG. 2, that the i-th line in the binary image includes white pixels consecutive from the start pixel position 21 to a position immediately preceding a pixel position 23 where a black pixel first appears in the i-th line and that the (i+1)-th line, which is subsequent to the i-th line, includes white pixels consecutive from the pixel position 23 (i.e., the position corresponding to the first black pixel in the i-th line) to the end pixel position 22. In FIG. 2, each pixel in the i-th line from a pixel position immediately subsequent to the first black pixel to the end pixel position 22 as well as each pixel in the (i+1) line from the start pixel position 21 to a position immediately preceding the pixel position 23 (i.e., immediately preceding the position corresponding to the first black pixel in the i-th line) can be either a black pixel or a white pixel.

The first to third thresholds are set so as not to cause contradiction between determination results.

Figure 3:
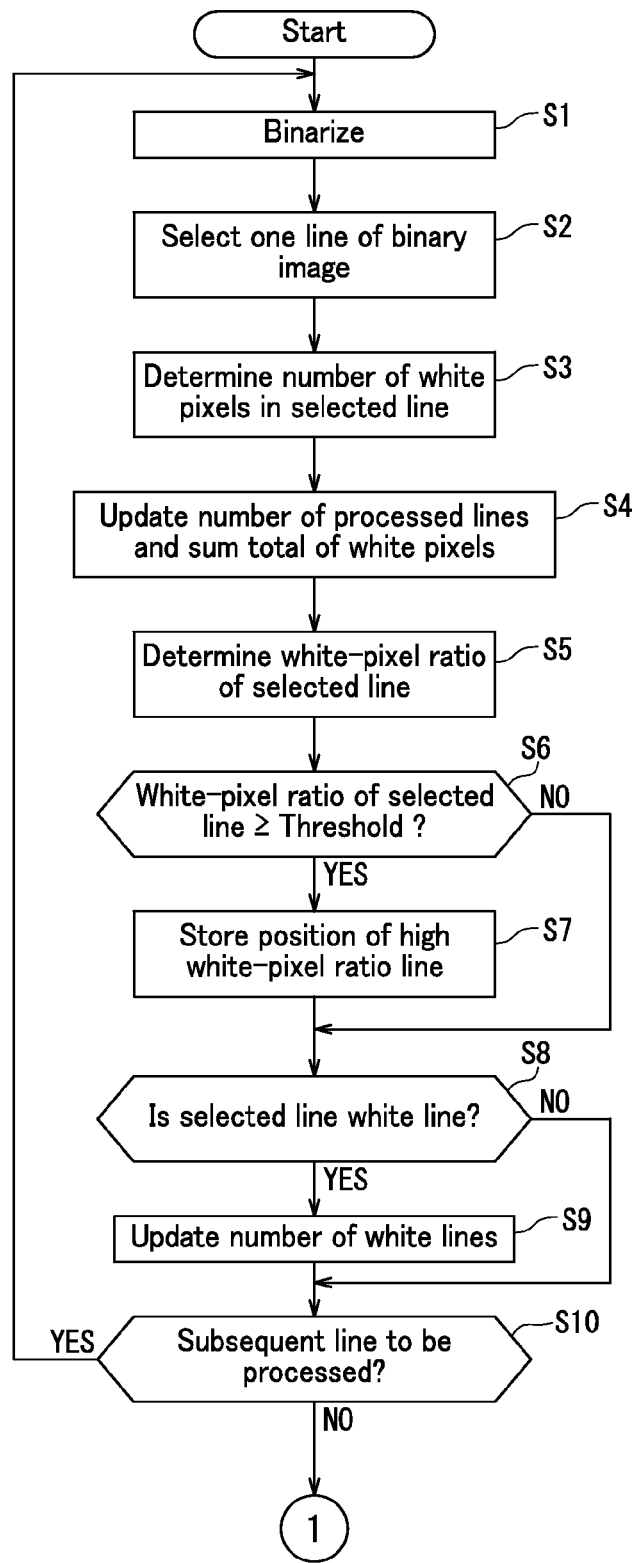
FIG. 3 is a flowchart illustrating the first part of processing performed by the image processing device shown in FIG. 1.
Figure 4:
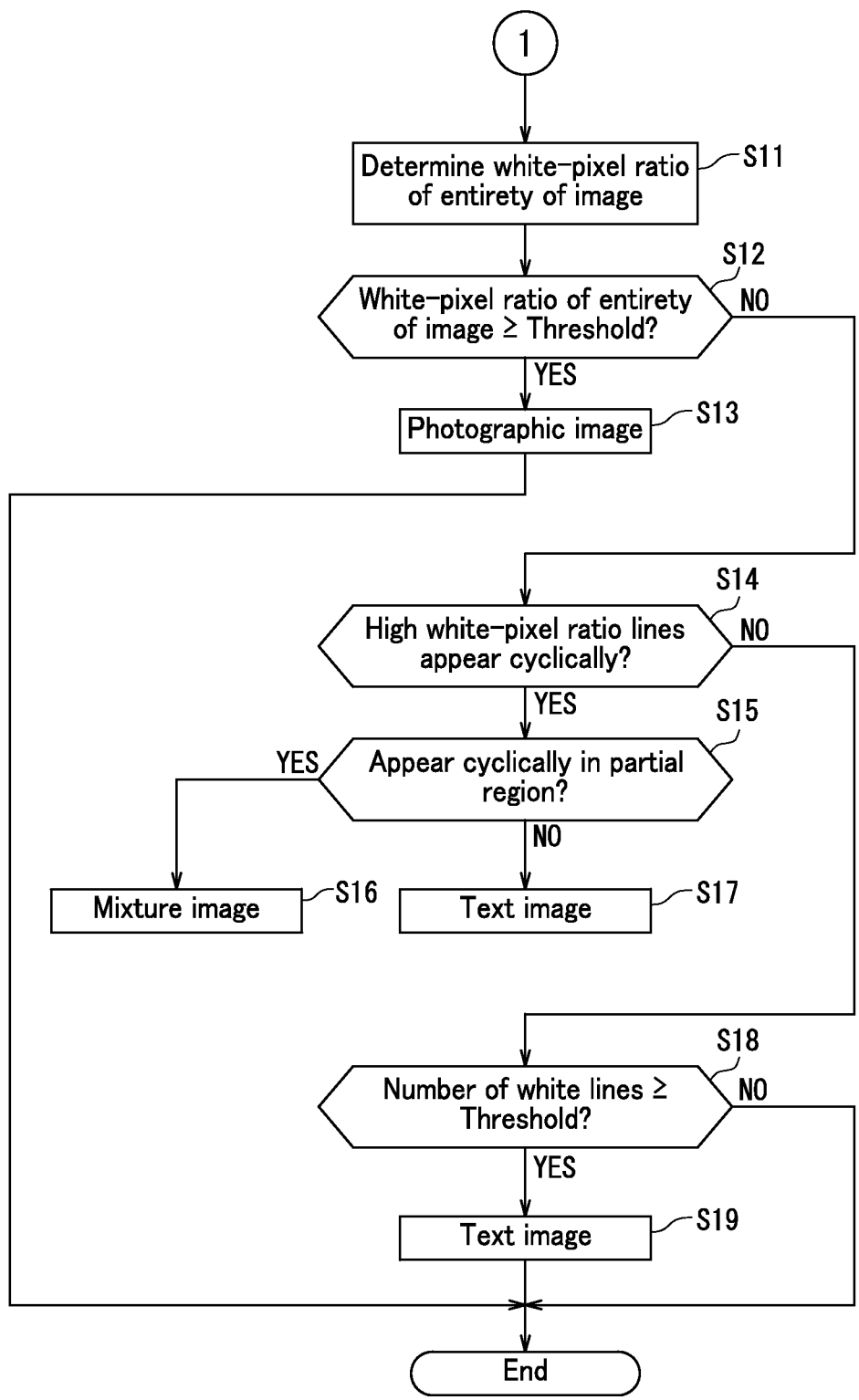
FIG. 4 is a flowchart illustrating the latter part of processing performed by the image processing device shown in FIG. 1.

The following describes the operation of the image processing device 10. FIG. 3 is a flowchart illustrating the first part of the processing performed by the image processing device 10 shown in FIG. 1. FIG. 4 is a flowchart illustrating the latter part of the processing performed by the image processing device 10 shown in FIG. 1.

First, the binarizing section 2 generates binary image data representing a binary image from the raster image data 11 representing a raster image (Step S1).

Next, the white-pixel ratio determining section 3 reads one line of the binary image (Step S2) and determines the number of white pixels included in the line (Step S3).

The white-pixel ratio determining section 3 then increments the number of processed lines counted from the first line of the binary image by one. In addition, the white-pixel ratio determining section 3 adds the determined number of white pixels to the sum total of white pixels (Step S4). The sum total of white pixels is cumulatively counted from the first line of the binary image. The number of processed lines and the sum total of white pixels are stored in the storage device 1.

The white-pixel ratio determining section 3 determines the ratio between the current total of pixels and the number of white pixels as a white-pixel ratio of the currently processed line (Step S5).

The white-pixel ratio determining section 3 further determines whether the white-pixel ratio of the currently processed line is equal to or greater than the first threshold (Step S6). When the white-pixel ratio of the currently processed line is equal to or greater than the first threshold (Step S6: YES), the white-pixel ratio determining section 3 stores, as the position of a high white-pixel ratio line, the position of the currently processed line to the storage device 1 (Step S7). Hereinafter, a line having a white-pixel ratio equal to or greater than the first threshold is referred to as a high white-pixel ratio line.

The white-pixel ratio determining section 3 further determines whether or not the currently processed line is a white line (Step S8). When the currently processed line is a white line (Step S8: YES), the white-pixel ratio determining section 3 increments the number of white lines counted from the first line of the binary image by one (Step S9).

Then, the white-pixel ratio determining section 3 determines whether or not there is a subsequent line to be processed (Step S10). When there is a subsequent line (Step S10: YES), the white-pixel ratio determining section 3 performs processing from Step S2 onward on the subsequent line.

When there is no subsequent line (Step S10: NO), the white-pixel ratio determining section 3 determines the white-pixel ratio of the entirety of the binary image by calculating b/(a×c)), where "a" denotes the number of processed lines, "b" denotes the sum total of white pixels, and "c" denotes the number of pixels per line (Step S11).

Then, the image-type determining section 4 determines whether or not the thus determined white-pixel ratio of the entirety of the binary image is equal to or less than the second threshold (Step S12). When the white-pixel ratio of the entirety of the binary image region is equal to or less than the second threshold (Step S12: YES), the image-type determining section 4 determines that the image represented by the raster image data 11 is a photographic image (Step S13).

On the other hand, when the white-pixel ratio of the entirety of the binary image is not equal to or less than the second threshold (Step S12: NO), the image-type determining section 4 determines whether or not high white-pixel ratio lines cyclically appear (Step S 14). When high white-pixel ratio lines cyclically appear (Step S14: YES), the image-type determining section 4 determines whether or not the high white-pixel ratio lines cyclically appear only in a partial region of the binary image (Step S15). When the high white-pixel ratio lines cyclically appear only in a partial region of the binary image (Step S15: YES), the image-type determining section 4 determines that the image represented by the raster image data 11 is a mixture image containing both a text image region and a photographic image region (Step S16). On the other hand, when the high white-pixel ratio lines cyclically appear throughout the entirety of the binary image (Step S15, NO), the image-type determining section 4 determines that the image represented by the raster image data 11 is a text image (Step S17).

In addition, when high white-pixel ratio lines appear randomly rather than cyclically (Step S14: NO), the image-type determining section 4 determines whether or not the number of white lines is equal to or greater than the third threshold (Step S18). When the number of white lines is equal to or greater than the third threshold (Step S18: YES), the image-type determining section 4 determines that the image represented by the raster image data 11 is a text image (Step S19).

When the above processing fails to determine the image type of the image represented by the raster image data 11 (Step S18: NO), the image type is left undetermined.

According to the present embodiment as has been described above, the binarizing section 2 generates binary image data representing a binary image from the raster image data 11 representing a raster image. Based on the binary image data, the white-pixel ratio determining section 3: (a) determines the white-pixel ratio for each line of the binary image represented by the binary image data and determines the position of each of lines having a white-pixel ratio equal to or greater than the first threshold; and (b) determines the white-pixel ratio of the entirety of the binary image based on the binary image data. The image-type determining section 4: (c) determines that the image represented by the raster image data 11 is a photographic image when the white-pixel ratio of the entirety of the binary image is equal to or less than the second threshold; and (d) determines that the image represented by the raster image data 11 includes a text image when the lines having a white-pixel ratio equal to or greater than the first threshold appear cyclically.

Through the above, the image type can be automatically determined using relatively simple algorithms.

Although the embodiment described above is a preferable example of the present disclosure, the present disclosure is not limited to the specific embodiment. Various modifications and alterations may be made without departing from the essence of the present disclosure.

For example, the binarizing section 2 according to the embodiment described above may be altered to generate two pieces of binary image data from the raster image data 11 such that one of the two pieces of binary image data represents an image in the same orientation as the image represented by the raster image data 11 and the other represents an image in a different orientation. More specifically, the two pieces of binary image data may be generated from the raster image data 11 such that one represents a binary image in the same orientation as the raster image and the other represents a binary image obtained by rotating the initial binary image 90 degrees. The white-pixel ratio determining section 3 and the image-type determining section 4 may perform the above processing on each piece of binary image data to determine the image type.

The embodiment described above may be altered such that the image type determined for an image represented by the raster image data 11 is added to metadata of an image data file containing the raster image data 11. Consequently, the image data is rendered searchable based on the image type included in the metadata.

In addition, the binarizing section 2 according to the embodiment described above may detect margins along the four sides of a binary image and remove the detected margins. The white-pixel ratio determining section 3 and the image-type determining section 4 may perform the above processing on the binary image data after the removal of the margins.

What is claimed is:

1. An image processing device comprising:
   a binarizing section that generates binary image data representing a binary image from raster image data representing a raster image;
   a white-pixel ratio determining section that, based on the binary image data,
      determines a white pixel ratio for each of a plurality of lines of the binary image and a position of each of lines having a white pixel ratio equal to or greater than a predetermined first threshold among the plurality of lines of the binary image, and
      determines a white pixel ratio for an entirety of the binary image; and
   an image-type determining section that determines an image type of the raster image based on the position of each of the lines having a white pixel ratio equal to or greater than the first threshold and the white pixel ratio of the entirety of the binary image, wherein
   the image-type determining section determines that
      the raster image is a photographic image when the white pixel ratio of the entirety of the binary image is equal to or less than a predetermined second threshold, and
      the raster image includes a text image when the lines having a white pixel ratio equal to or greater than the first threshold appear cyclically in the binary image.

2. The image processing device according to claim 1, wherein
   the image-type determining section determines that
      the raster image is a text image when the lines having a white pixel ratio equal to or greater than the first threshold appear cyclically throughout the entirety of the binary image, and
      the raster image is a mixture image containing both a photographic image region and a text image region when the lines having a white pixel ratio equal to or greater than the first threshold appear cyclically in a partial region of the binary image.

3. The image processing device according to claim 1, wherein
   the white-pixel ratio determining section determines a number of white lines included in the binary image, and
   the image-type determining section determines that the raster image is a text image when the number of white lines is equal to or greater than a predetermined third threshold.

4. The image processing device according to claim 3, wherein
   the white-pixel ratio determining section detects, as a white line from the plurality of lines of the binary image,
      a line in which all pixels from a start pixel position to an end pixel position are white pixels, and
      a line that includes white pixels consecutive from the start pixel position to a position immediately preceding a first black pixel in the line and that is followed by a line including white pixels consecutive from a position corresponding to the first black pixel in the preceding line to the end pixel position.

5. The image processing device according to claim 1, wherein
   when the image type of the raster image is successfully determined, the image type is added to metadata of an image data file containing the raster image data.

6. The image processing device according to claim 1, wherein
   the binarizing section generates two pieces of binary image data from the raster image data, one of the two pieces of binary image data representing a binary image in a same orientation as the raster image, the other of the two pieces of binary image data representing a binary image in a different orientation.

7. The image processing device according to claim 1, further comprising
   a storage device that stores the raster image data therein, wherein
   the storage device is used as a work area by the binarizing section, the white-pixel ratio determining section, and the image-type determining section.

* * * * *